United States Patent Office 3,140,181
Patented July 7, 1964

3,140,181
WATER-FAST TWO-COMPONENT DIAZOTYPE PAPER
Johannes Henricus Andreas Wilders and Wilhelmus Josephus van Rhijn, Venlo, Netherlands, assignors to Chemische Fabriek L. van der Grinten N.V., Venlo, Netherlands, a Dutch corporation
No Drawing. Filed July 24, 1961, Ser. No. 125,941
Claims priority, application Netherlands Aug. 3, 1960
15 Claims. (Cl. 96—75)

The invention relates to two-component diazotype paper containing a light-sensitive diazo compound and an azo component, which upon development form together an azo dyestuff which carries at least one group enhancing the solubility of the azo dyestuff in water.

Such diazotype papers are known. For example, in such papers use may be made of combinations of a diazo compound derived from a p-phenylene diamine, and a readily water-soluble azo component of the naphthol type, such as 2,3-dihydroxy naphthalene 6-sulphonic acid, 2,7-dihydroxy naphthalene 3,6-disulphonic acid, 1,8-dihydroxy naphthalene 4-sulphonic acid, 2-hydroxy naphthalene 6-sulphonic acid, 2-hydroxy naphthalene 3,6-disulphonic acid, or of the phenol type, such as resorcinol sulphonic acids, phloroglucinol carboxylic acid, 1-acetyl-acetamino benzene 3-sulphonic acid, and 1-(4'-sulphophenyl) 3-methyl pyrazolone-(5). Upon coupling, these combinations yield water-soluble azo dyestuffs.

In such diazotype papers use is also made of diazo compounds with one or more substituents enhancing the solubility in water, such as a diazo compound with a dialkylamino group in para-position, in which one or both of the alkyl radicals carry a hydroxyl group, such as p-diazo N-ethyl N-hydroxyethylaniline, or a diazonaphthol sulphonic acid, such as 2-diazo 1-naphthol 5-sulphonic acid and 1-diazo 2-naphthol 4-sulphonic acid. These diazo compounds yield water-soluble azo dyestuffs upon coupling with a polyvalent phenol, such as resorcinol and phloroglucinol, or a naphthol such as 2,3-dihydroxynaphthalene.

Two-component diazotype paper which contains a diazo compound and/or an azo component with a group enhancing the solubility in water, yields copies the azo dyestuff image of which has insufficient water-fastness, i.e., when the copies get wet, the azo dyestuff image will bleed owing to the solubility of the azo dyestuff in water. This is a serious drawback, which is especially inconvenient when the copies have to be painted with water colour, which is often the case in practice when copies are made from technical drawings. The azo dyestuff image then not only loses its sharp contours, but moreover the dissolving azo dyestuff will dirty the water colour.

Several agents have been suggested in the literature for improving the water-fastness of the azo dyestuff image in copies made on two-component diazotype paper which contains a diazo compound and/or an azo component with a group enhancing the solubility in water. In the main these agents are substances containing a basic nitrogen atom, such as: aryl derivatives of guanidine and biguanidine (United States patent specification No. 1,807,761), amines, such as cyclohexylamine, dicyclohexylamine, morpholine, amylamine, glycine, quinoline, and ethylene diamine (United States patent specification No. 2,531,485), aliphatic polyamines, such as polyethylene imine and the reaction product of polyethylene diamine and dimethyl sulphate (German patent specification No. 888,804), condensation products of (1) formaldehyde, (2) dicyanodiamide, and (3) a salt of ammonia or of an aromatic amine (United States patent specification No. 2,593,911).

It has been proposed to improve the water-fastness of textile materials dyed with acid dyestuffs by the use of substances containing a basic nitrogen atom. A suitable substance is, for example, a quaternary ammonium base obtained by peralkylation of 5,5'-methylene bis-(2-methyl benzimidazole) (French patent specification No. 803,821).

The use of such a compound for improving the water-fastness of the azo dyestuff image in copies on two-component diazotype paper which contains an azo component with a group enhancing the solubility in water, has also been suggested in the literature (Fiat Report 813, microfilm P.B. 25,781, pages 85–86, Solidogen BS).

The above-mentioned substances indeed effect an improvement in the water-fastness of many azo dyestuffs. The said quaternary ammonium base and several of the condensation products of dicyanodiamide in general yield the best results, but the improvement effected with them still leaves a good deal to be desired. Thus, if relatively large quantities of these compounds are used, a reasonable improvement of the water-fastness can indeed be obtained, but large quantities have a detrimental effect on the development of the copies, so that weak images are often obtained. Moreover, both the said quaternary ammonium base and the said condensation products often form precipitates when added to aqueous sensitizing liquids which contain a diazo compound or an azo component with a group enhancing the solubility in water. In such cases these compounds have to be applied, in the production of the diazotype material, in a separate treatment before or after sensitization.

According to the present invention there is provided two-component diazotype paper containing a light-sensitive diazo compound and azo component, which upon development form together an azo dyestuff with at least one group enhancing the solubility in water, the said paper further containing, as an agent for improving the water-fastness of the azo dyestuff, a compound selected from 2-hydroxymethyl 1',2',4,5-naphthimidazole, 2-hydroxyethyl 1',2',4,5-naphthimidazole, and 1',2',4,5-naphthimidazole with a hydrogen atom, a methyl, a hydroxymethyl, or a hydroxyethyl group in 2-position and a hydroxyl group in 5', 6', or 7'-position. Such diazotype paper yields copies the azo dyestuff image of which has excellent water-fastness, in many cases better than the azo dyestuff image of copies on corresponding diazotype paper containing a comparable quantity of the best of the previously known agents.

The said imidazoles are all sufficiently soluble in the aqueous sensitizing liquids commonly used for making two-component diazotype paper. Consequently they need not be applied in or on the diazotype paper in a separate treatment, before or after sensitization. In most cases they are applied as salts of strong acids, such as hydrochloric acid.

In order to obtain copies with an azo dyestuff of excellent water-fastness in most cases, a quantity of one or more of the said imidazoles varying between 1 mol and 2 mols of imidazole per mol of diazo compound is applied in the diazo-type paper according to the invention. Often smaller quantities will suffice, for example when the imidazoles are applied in combination with one or more of the known agents. If, however, exclusively imidazole is used and if the azo dyestuff contains more than one group enhancing the solubility in water, a quantity of imidazole which is larger than 2 mols per mol of diazo compound may be required. Such a larger quantity, however, does not have a detrimental effect on the development of the copies, this being in contrast with, for instance, the effect of an equally active quantity of one of the condensation products of dicyanodiamide.

The required quantity of imidazole moreover is always considerably smaller than an equally active quantity of those condensation products.

Of course in diazotype papers containing diazo compounds and azo components, from which azo dyestuffs with poor water-fastness are formed, it is preferred that no agents which enhance the solubility of the azo dyestuffs, such as polyethylene glycols, glycerol, and the like, should be present.

The agents for improving the water-fastness, applied in the diazotype paper according to the present invention, are all very effective. Nevertheless there are differences in activity among them. The most active agents are the 1',2',4,5-naphthimidazoles the naphthalene nucleus of which carries a hydroxyl group in 5', 6', or 7'-position, such as 5'-hydroxy 1',2',4,5-naphthimidazole, 5'-hydroxy 2-methyl 1',2',4,5-naphthimidazole, 5'-hydroxy 2-hydroxymethyl 1',2',4,5-naphthimidazole, 5'-hydroxy 2-α-hydroxyethyl 1',2',4,5-naphthimidazole, 5'-hydroxy 2-β-hydroxyethyl 1',2',4,5-naphthimidazole, 6'-hydroxy 1',2',-4,5-naphthimidazole, 6'-hydroxy 2-methyl 1',2',4,5-naphthimidazole, 6'-hydroxy 2-hydroxymethyl 1',2',4,5-naphthimidazole, 6'-hydroxy 2-α-hydroxyethyl 1',2',4,5-naphthimidazole, 6'-hydroxy 2-β-hydroxyethyl 1',2',4,5-naphthimidazole, 7'-hydroxy 1',2',4,5-naphthimidazole, 7'-hydroxy 2-methyl 1',2',4,5-naphthimidazole, 7'-hydroxy 2-hydroxymethyl 1',2',4,5-naphthimidazole, 7'-hydroxy 2-α-hydroxyethyl 1',2',4,5-naphthimidazole, 7'-hydroxy 2-β-hydroxyethyl 1',2',4,5-naphthimidazole. The possibility for writing with ink on copies in which these compounds are present is also greatly improved. This is especially important when a layer of fine particles of, for instance, silicon dioxide, aluminium oxide, and the like is present on the surface of the copies. In order to increase the density of the azo dyestuff image and to improve the uniformity of the light-sensitive layer, modern diazotype papers are often provided with such fine particles either by applying liquid dispersions of the particles on the paper surface before sensitization or by adding them to the sensitizing liquid and then applying them on the paper surface together with the other components of the sensitizing liquid. These particles often cause serious ink-feathering in writing or drawing with ink on the copies the surface of which has been provided with such particles. If, however, one of the above-mentioned naphthimidazoles is also present on the surface of those copies, the said particles have a much smaller detrimental effect, if any, on the possibility of writing with ink on the copies, while their favourable influence on the density of the azo dye-stuff image and the uniformity of the light-sensitive layer is maintained. The said naphthimidazoles moreover will sometimes favourably affect the adhesion of such particles with colloidal dimensions to the surface of the copies.

The hydroxynaphthimidazole compounds are able to couple with diazo compounds to form azo dyestuffs, mostly red-coloured ones. Their coupling activity, however, is small. In the diazotype paper according to the invention it is preferred to employ an azo component which is sufficiently active and is used in a quantity which is large enough to convert all the diazo molecules into azo dyestuff, so that no azo dyestuff is formed from the added hydroxynaphthimidazole.

Diazotype material containing 6'- or 7'-hydroxy 1',2',4,5-naphthimidazole is known. In German patent specification No. 697,051, 6'-hydroxy 1',2',4,5-naphthimidazole and 7'-hydroxy 1',2',4,5-naphthimidazole have been suggested as azo components for the diazotype process. They couple slowly to form more or less red azo dyestuffs. In the diazotype material described in this patent specification no other azo components besides these naphthimidazoles are applied.

United States patent specification No. 2,542,716 describes two-component diazotype material which contains 7'-hydroxy 1',2',4,5-naphthimidazole in combination with a very small quantity of a more actively coupling azo component. The latter may be 1,8-dihydroxy naphthalene 4-sulphonic acid. Per gram molecule of diazo compound only 1/60–1/30 gram-molecule of it is present. Consequently the azo dyestuff formation in this diazotype material, at least in the poorly exposed and non-exposed portions, is not essentially determined by the 1,8-dihydroxynaphthalene 4-sulphonic acid, but by the 7'-hydroxy 1',2',4,5-naphthimidazole. The very small quantity of azo dyestuff formed from the 1,8-dihydroxynaphthalene 4-sulphonic acid moreover does not cause any serious lack of water-fastness of the azo dyestuff image, not even in the portions where a large proportion of the diazo compound has been decomposed during exposure and only little azo dyestuff is formed from the 7'-hydroxy 1',2',4,5-naphthimidazole.

In modern two-component diazotype papers the highly light-sensitive diazo compounds derived from p-amino 2,5-dialkoxy phenyl morpholine, in which each alkoxy group contains at most 2 carbon atoms, are often applied together with 2,3-dihydroxynaphthalene 6-sulphonic acid or one of its water-soluble salts as the azo component and, if necessary, together with other azo components, e.g., yellow-coupling ones. Because of their great light-sensitivity these diazo-type papers are very attractive. However, they yield copies the azo dyestuff images of which have poor water-fastness. If, however, these diazotype papers contain one or more of the above-mentioned imidazoles, they yield copies the azo dyestuff images of which have excellent water-fastness.

For the preparation of 1',2',4,5-naphthimidazoles with a hydrogen atom, a methyl, a hydroxymethyl, or a hydroxyethyl group in 2-position, the methods of preparation for the corresponding benzimidazoles described in Journal Chem. Soc. 1928, II, 2395, can be used, the starting product being naphthalene 1,2-diamine which may carry in 5, 6, or 7-position a sulphonic acid group which is converted into a hydroxyl group after closure of the imidazole ring (see BIOS Final Report 772, Item No. 22, page 5).

The following examples will serve to illustrate the invention:

*Example I*

White base-paper for the diazotype process of weight 80 g./m.$^2$ is precoated with approximately 10 g./m.$^2$ of a dispersion of 30 g. of Aerosil (colloidal silica) in 1000 cm.$^3$ of water and dried.

The surface thus treated is sensitized (at room temperature) with a solution of:

16 g. of p-diethylamino benzene diazonium chloride, zinc chloride double salt
40 g. of 2,3-dihydroxy naphthalene 6-sulphonic acid sodium salt
14 g. of tartaric acid
10 g. of citric acid
30 g. of thiourea
20 g. of naphthalene 1,3,6-trisulphonic acid sodium salt
20 g. of zinc sulphate 7 aq.
30 g. of zinc chloride
50 g. of N.N'-dimethylurea
30 ml. of Vinnapas H.60 (polyvinyl acetate emulsion)
20 g. of 7'-hydroxy 1',2',4,5-naphthimidazole HCl-salt in 1000 cm.$^3$ of water and dried.

The light-sensitive side of a sheet of the diazotype paper thus obtained is covered with a tracing with broad inklines having good absorption for ultraviolet light (e.g., black lines) and then exposed via the tracing until, underneath the blank portions of the tracing, the diazo compound has bleached out completely. After this the image is developed in ammonia vapour.

The diazotype copy thus made shows a dense blue image on a clear white background. The silica particles adhere well to the surface of the copy. It is possible to write or draw on the surface of the copy with various inks without encountering difficulties in the way of ink-feathering.

When this copy gets wet, it appears that the azo dyestuff image shows hardly any bleeding. The azo dyestuff image of a copy on diazotype paper sensitized with a liquid according to the above formula, but from which the imidazole has been omitted, on the contrary will bleed considerably under identical circumstances. The surface of such a copy will soon be damaged because the silica particles and the azo dyestuff present thereon tend to come off. Several inks show serious feathering on such a copy.

If instead of 20 g. of 7'-hydroxy 1',2',4,5-naphthimidazole, 40 g. of a quaternary ammonium base obtained by peralkylation of 5,5'-methylene bis-(2-methyl benzimidazole) is used, an azo dyestuff image is obtained which still bleeds perceptibly when the copy gets wet. The sensitizing liquid is turbid. It is not possible to dissolve more than 40 g. of this compound in the sensitizing liquid at room temperature. If instead of the above-mentioned naphthimidazole it is desired to use one of the said condensation products of dicyanodiamide, these products, when added to the above-mentioned sensitizing liquid, appear to form precipitates therein. They can indeed be added to the silica dispersion. If 40 g. of such a condensation product is added to the latter, a considerable improvement of the water-fastness of the azo-dyestuff image is obtained, but this image is much less dense than that according to the example.

*Example II*

White base-paper for the diazotype process of weight 80 g./m.$^2$ is sensitized with a solution of the following, applied at 18° C.:

17 g. of 4-morpholino 2,5-diethoxy benzene diazonium chloride, zinc chloride double salt
10 g. of 2,3-dihydroxy naphthalene 6-sulphonic acid sodium salt
5 g. of 2,7-dihydroxy naphthalene 3,6-disulphonic acid sodium salt
1.3 g. of acetylacetanilide
30 g. of tartaric acid
3 g. of boric acid
25 g. of zinc chloride
10 g. of N-2-hydroxyethyl N'-allyl thiourea
30 g. of N.N'-dimethylurea
20 g. of 2-hydroxymethyl 1',2',4,5-naphthimidazole HCl-salt
30 cm.$^3$ of Vinnapas H.60 in 1000 cm.$^3$ of water and dried.

A sheet of the highly light-sensitive diazotype paper thus prepared is imagewise exposed and developed as described in Example I. The copy obtained shows a dense neutral black azo dyestuff image on a white background, which shows hardly any bleeding when the copy gets wet, this being in striking contrast with the azo dyestuff image of a copy on corresponding diazotype paper which does not contain the imidazole.

*Example III*

White base-paper for the diazotype process of weight 80 g./m.$^2$ is sensitized with a solution of the following, applied at 18° C.:

14 g. of 2-diazo 1-hydroxynaphthalene 5-sulphonic acid sodium salt
4 g. of phloroglucinol
5 g. of tartaric acid
60 g. of urea
21 g. of thiourea
13.5 g. of sodium chloride
22.5 g. of zinc sulphate 7 aq.
30 g. of zinc chloride
20 g. of 7'-hydroxy 1',2',4,5-naphthimidazole HCl-salt in 1000 cm.$^3$ of water and dried.

A sheet of the diazotype paper thus made is imagewise exposed and developed as described in Example I. The copy obtained, which shows a violet image on a white background, has considerably better water-fastness than a copy on corresponding diazotype paper without the said imidazole.

*Example IV*

White base-paper for the diazotype process of weight 80 g./m.$^2$ is sensitized with a solution of the following, applied at room temperature:

17 g. of p-dimethylamino benzene diazonium chloride, zinc chloride double salt
20 g. of 2-hydroxynaphthalene 6-sulphonic acid sodium salt
30 g. of citric acid
30 g. of thiourea
40 g. of zinc chloride
50 g. of N.N'-dimethylurea
20 g. of 6'-hydroxy 1',2',4,5-naphthimidazole HCl-salt
30 cm.$^3$ of Vinnapas H.60.

in 1000 cm.$^3$ of water and dried.

A sheet of this diazotype paper is imagewise exposed and developed as described in Example I.

The copy shows a dense brown azo dyestuff image which exhibits hardly any bleeding when it gets wet. The copy can be properly painted with water colour. In diazotype paper not containing imidazole, the azo dyestuff of the image mixes with the water colour.

*Example V*

Tracing paper is sensitized with a solution of the following, applied at 20° C.:

30 g. of p-N-2'-hydroxyethyl N-ethylamino benzene diazonium chloride, zinc chloride double salt
30 g. of tartaric acid
10 g. of boric acid
30 g. of thiourea
30 g. of zinc chloride
30 g. of resorcinol
30 g. of 2-methyl 7'-hydroxy 1',2',4,5-naphthimidazole
250 cm.$^3$ of ethanol in 750 cm.$^3$ of water and then dried.

After imagewise exposure and development (as described in Example I) of a sheet of the diazotype paper thus obtained, a transparent diazotype copy with a brown image is obtained, which does not bleed when it gets wet. The azo dyestuff image of a copy on corresponding diazotype material, but without imidazole, on the contrary has poor water-fastness.

The transparent copies obtained according to this example are very suitable as intermediate originals for making further copies on photoprinting material.

*Example VI*

White base-paper for the diazotype process of weight 80 g./m.$^2$ is treated on the side to be sensitized with a solution containing the following, applied at 18° C.:

20 g. of 2-hydroxymethyl 1',2',4,5-naphthimidazole HCl-salt and
20 cm.$^3$ of a 2% solution by weight of Tylose SL 100 in water,
1000 cm.$^3$ of water and dried.

The paper thus precoated is sensitized with the sensitizing solution of Example I, from which the 7'-hydroxy 1',2',4,5-naphthimidazole HCl-salt, however, has been omitted. A sheet of the diazotype paper is then imagewise exposed and developed in ammonia vapour. The azo dyestuff image of the diazotype copy is a neutral blue and has excellent water-fastness.

The azo dyestuff image of a copy on corresponding diazotype material, but without the imidazole, bleeds considerably when it gets wet.

I claim:

1. Two-component diazotype paper comprising a paper support sensitized thereover with a light-sensitive composition comprising a light-sensitive diazo compound and an azo coupling component which couples with said compound more actively than does any of 2-hydroxymethyl 1',2',4,5-naphthimidazole, 2-hydroxyethyl 1',2',4,5-naphthimidazole and 1',2',4,5-naphthimidazoles having a hydroxyl group in one of the 5', 6', and 7' positions on the naphthalene nucleus and which upon coupling with said compound forms therewith a water soluble azo dyestuff that tends to bleed when wetted by water, said support carrying thereover in intimate contact with said diazo compound and said azo coupling component an agent to enhance the water-fastness of said dyestuff, selected from the group consisting of 2-hydroxymethyl 1',2',4,5-naphthimidazole,
2-hydroxyethyl 1',2',4,5-naphthimidazole,
1',2',4,5-naphthimidazoles having in the 2-position on the imidazole nucleus a constituent selected from the class consisting of a hydrogen atom and methyl, hydroxy-methyl and hydroxy-ethyl groups and having a hydroxyl group in one of the 5', 6' and 7' positions on the naphthalene nucleus,
mixtures of said naphthimidazoles, and water soluble acid salts thereof, said azo coupling component having a coupling activity, and being present in a concentration exceeding that which is stoichiometric to the quantity of said diazo compound present, sufficient that upon development of said paper said component will couple with substantially all the diazo compound therein to the exclusion of any substantial coupling of said agent therewith, said agent being present in a quantity sufficient to render substantially non-bleeding, when wetted by water, an image of said dyestuff formed on said support by imagewise exposure and development of said paper.

2. Two-component diazotype paper according to claim 1, said light-sensitive composition containing said agent in admixture with said diazo compound and said azo coupling component.

3. Two-component diazotype paper according to claim 1, said support carrying thereover in intimate contact with said light-sensitive composition a coating of inorganic oxide particles of colloidal size.

4. Two-component diazotype paper according to claim 3, said colloidal particles and said agent being in admixture with said diazo compound and said azo coupling component as parts of said light-sensitive composition.

5. Two-component diazotype paper according to claim 3, said coating covering a surface of said support and being overlaid by said light-sensitive composition, said composition containing said agent in admixture with said diazo compound and said azo coupling component.

6. Two-component diazotype paper according to claim 1, said agent being carried on a surface of said support in a sub-layer overlaid by said light-sensitive composition.

7. Two-component diazotype paper according to claim 1, said light-sensitive composition containing said agent in admixture with said diazo compound and said azo coupling component, at a concentration of about 1 to 2 mols of said agent per mol of said diazo compound.

8. Two-component diazotype paper comprising a paper support sensitized thereover with a light-sensitive composition comprising a light-sensitive diazo compound and an azo coupling component which couples with said compound more actively than does any of 2-hydroxymethyl 1',2',4,5-naphthimidazole, 2-hydroxyethyl 1',2',4,5-naphthimidazole and 1',2',4,5-naphthimidazoles having a hydroxyl group in one of the 5', 6' and 7' positions on the naphthalene nucleus and which upon coupling with said compound forms therewith a water soluble azo dyestuff that tends to bleed when wetted by water, said support carrying thereover in intimate contact with said diazo compound and said azo coupling component a quantity of 5' hydroxy-1',2',4,5-naphthimidazole, said azo coupling component having a coupling activity, and being present in a concentration exceeding that which is stoichiometric to the quantity of said diazo compound present, sufficient that upon development of said paper said component will couple with substantially all the diazo compound therein to the exclusion of any substantial coupling of said naphthimidazole therewith, said naphthimidazole being present in a quantity sufficient to render substantially non-bleeding, when wetted by water, an image of said dyestuff formed on said support by imagewise exposure and development of said paper.

9. Two-component diazotype material according to claim 1, said diazo compound being a diazo derivative of a p-phenylene diamine, said azo coupling component being selected from the group consisting of hydroxy-naphthalene sulfonic acids,
resorcinol sulfonic acids,
phloroglucinol carboxylic acid,
1-acetylacetamino benzene 3-sulfonic acid,
1-(4'-sulfophenyl) 3-methyl pyrazolone-(5),
and salts thereof.

10. Two-component diazotype material according to claim 1, said diazo compound being selected from the group consisting of p-N-alkyl-N-hydroxyalkyl amino and p-dihydroxyalkyl amino-benzene diazo compounds and diazonaphthol sulfonic acid compounds, said azo coupling component being a naphthol.

11. A sensitizing composition for the manufacture of two-component diazotype paper, comprising a mixture of a light-sensitive diazo compound, an azo coupling component which couples with said compound more actively than does any of 2-hydroxymethyl 1',2',4,5-naphthimidazole, 2-hydroxyethyl 1',2',4,5-naphthimidazole and 1',2', 4,5-naphthimidazoles having a hydroxyl group in one of the 5', 6' and 7' positions on the naphthalene nucleus and which upon coupling with said compound forms therewith a water soluble azo dyestuff that tends to bleed when wetted by water, and, per mol of said diazo compound, about 1 to 2 mols of an agent to enhance the water-fastness of said dyestuff, selected from the group consisting of 2-hydroxymethyl 1',2',4,5-naphthimidazole,
2-hydroxyethyl 1',2',4,5-naphthimidazole,
1',2',4,5-naphthimidazoles having in the 2-position on the imidazole nucleus a constituent selected from the class consisting of a hydrogen atom and methyl, hydroxy-methyl and hydroxy-ethyl groups and having a hydroxyl group in one of the 5', 6' and 7' positions on the naphthalene nucleus,
mixtures of said naphthimidazoles, and water soluble acid salts thereof, said azo coupling component having a coupling activity, and being present in a concentration exceeding that which is stoichiometric to the quantity of said diazo compound present, sufficient that under coupling conditions it will couple with substantially all the diazo compound in said composition to the exclusion of any substantial coupling of said agent therewith.

12. Two-component diazotype paper comprising a paper support sensitized thereover with a light-sensitive composition comprising a light-sensitive diazo compound and an azo coupling component which couples with said compound more actively than do any of 2-hydroxymethyl 1',2',4,5-naphthimidazole, 2-hydroxyethyl 1',2', 4,5-naphthimidazole and 1',2',4,5-naphthimidazoles having a hydroxyl group in one of the 5', 6' and 7' positions on the naphthalene nucleus, and which upon coupling with said compound forms therewith a water soluble azo dyestuff that tends to bleed when wetted by water, said support carrying thereover in intimate contact with said diazo compound and said azo coupling component a quantity of 6'-hydroxy-1',2',4,5-naphthimidazole, said azo coupling component having a coupling activity, and being present in a concentration exceeding that which is stoichiometric to the quantity of said diazo compound present, sufficient that upon development of said paper said component will couple with substantially all the diazo compound therein to the exclusion of any substantial coupling of said naphthimidazole therewith, said naphthimidazole being present in a quantity sufficient to render substantially non-bleeding, when wetted by water, an image of said dyestuff formed on said support by imagewise exposure and development of said paper.

13. Two-component diazotype paper comprising a paper support sensitized thereover with a light-sensitive composition comprising a light-sensitive diazo compound and an azo coupling component which couples with said compound more actively than do any of 2-hydroxymethyl 1′,2′,4,5-naphthimidazole, 2-hydroxyethyl 1′,2′,4,5-naphthimidazole and 1′,2′,4,5-naphthimidazoles having a hydroxyl group in one of the 5′, 6′ and 7′ positions on the naphthalene nucleus and which upon coupling with said compound forms therewith a water soluble azo dyestuff that tends to bleed when wetted by water, said support carrying thereover in intimate contact with said diazo compound and said azo coupling component a quantity of 7′-hydroxy-1′,2′,4,5-naphthimidazole, said azo coupling component having a coupling activity, and being present in a concentration exceeding that which is stoichiometric to the quantity of said diazo compound present, sufficient that upon development of said paper said component will couple with substantially all the diazo compound therein to the exclusion of any substantial coupling of said naphthimidazole therewith, said naphthimidazole being present in a quantity sufficient to render substantially non-bleeding, when wetted by water, an image of said dyestuff formed on said support by imagewise exposure and development of said paper.

14. Two-component diazotype paper comprising a paper support sensitized thereover with a light-sensitive composition comprising a light-sensitive diazo compound and an azo coupling component which couples with said compound more actively than do any of 2-hydroxymethyl 1′,2′,4,5-naphthimidazole, 2-hydroxyethyl 1′,2′,4,5-naphthimidazole and 1′,2′,4,5-naphthimidazoles having a hydroxyl group in one of the 5′, 6′ and 7′ positions on the naphthalene nucleus and which upon coupling with said compound forms therewith a water soluble azo dyestuff that tends to bleed when wetted by water, said support carrying thereover in intimate contact with said diazo compound and said azo coupling component a quantity of 2-methyl-7′-hydroxy - 1′,2′,4,5 - naphthimidazole, said azo coupling component having a coupling activity, and being present in a concentration exceeding that which is stoichiometric to the quantity of said diazo compound present, sufficient that upon development of said paper said component will couple with substantially all the diazo compound therein to the exclusion of any substantial coupling of said naphthimidazole therewith, said naphthimidazole being present in a quantity sufficient to render substantially non-bleeding, when wetted by water, an image of said dyestuff formed on said support by imagewise exposure and development of said paper.

15. Two-component diazotype material according to claim 1, said diazo compound being selected from the group consisting of p-N-alkyl-N-hydroxyalkyl amino and p-dihydroxyalkyl amino benzene diazo compounds and diazonaphthol sulfonic acid compounds, said azo coupling component being a polyvalent phenol.

References Cited in the file of this patent
UNITED STATES PATENTS

| | | |
|---|---|---|
| 2,212,959 | Schmidt et al. | Aug. 27, 1940 |
| 2,542,716 | Slifkin | Feb. 20, 1951 |
| 2,548,845 | Neumann et al. | Apr. 10, 1951 |
| 2,663,712 | Tulagin | Dec. 22, 1953 |
| 2,694,010 | Botkin | Nov. 9, 1954 |